United States Patent [19]
Nelson

[11] Patent Number: 5,865,995
[45] Date of Patent: Feb. 2, 1999

[54] SYSTEM FOR TREATING LIQUIDS WITH A GAS

[76] Inventor: William R. Nelson, 22029 54th Ave. W., Mountlake Terrace, Wash. 98043

[21] Appl. No.: 832,386

[22] Filed: Apr. 2, 1997

[51] Int. Cl.⁶ .................................................. B01D 19/00
[52] U.S. Cl. .......................... 210/205; 210/206; 210/218; 55/237; 96/181; 96/216; 261/79.2; 261/DIG. 42; 261/DIG. 75
[58] Field of Search ..................... 210/192, 205, 210/206, 218, 760; 55/237; 96/181, 216; 261/79.2, DIG. 42, DIG. 75

[56] References Cited

U.S. PATENT DOCUMENTS

| | | | |
|---|---|---|---|
| 3,581,467 | 6/1971 | Donnelly | 261/79.2 |
| 3,771,288 | 11/1973 | Wisman et al. | 55/204 |
| 3,771,290 | 11/1973 | Stethem | 55/205 |
| 4,259,267 | 3/1981 | Wang | 261/DIG. 75 |
| 4,834,343 | 5/1989 | Boyes | 261/DIG. 75 |
| 4,880,451 | 11/1989 | Konijn | 55/237 |
| 5,203,891 | 4/1993 | Lema | 55/205 |
| 5,283,048 | 2/1994 | Martin et al. | 55/237 |
| 5,514,267 | 5/1996 | Machiya et al. | 261/DIG. 42 |
| 5,622,545 | 4/1997 | Mazzei et al. | 96/216 |

Primary Examiner—Jay H. Woo
Assistant Examiner—Betsey J. Morrison
Attorney, Agent, or Firm—Delbert J. Barnard

[57] ABSTRACT

A gas treatment system for liquids can increase gas exposure and contact time. A liquid stream into which treatment gas is added is directed into a vortex chamber (130). The vortex chamber (130) creates a downward spiral flow of the liquid stream forcing it into an upper end inlet (145) of a contact tank (114). The liquid stream with entrained gas bubbles is forced to move downwardly through the tank to a lower end outlet (122). The flow then moves upwardly to a degassing chamber (146) wherein the treatment gas is separated from the liquid and delivered through an outlet (124) for use. Because the entrained bubbles are forced downwardly through the contact tank (114), the gas bubbles remain quite small and contact time is prolonged. Release of the treatment gas is further facilitated by positioning the degassing chamber (146) at an elevated position which promotes gas bubble expansion, combination and release.

16 Claims, 6 Drawing Sheets

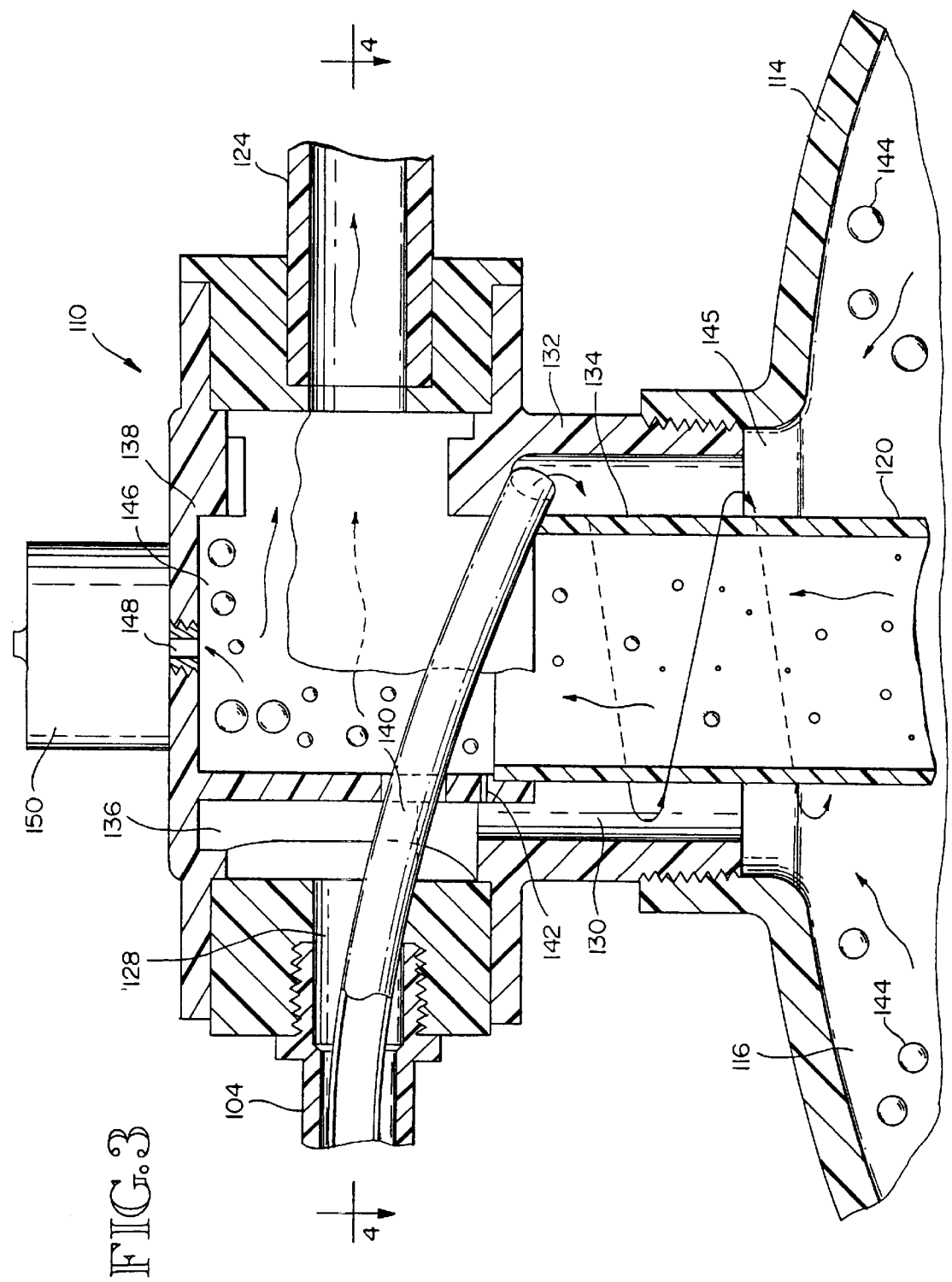

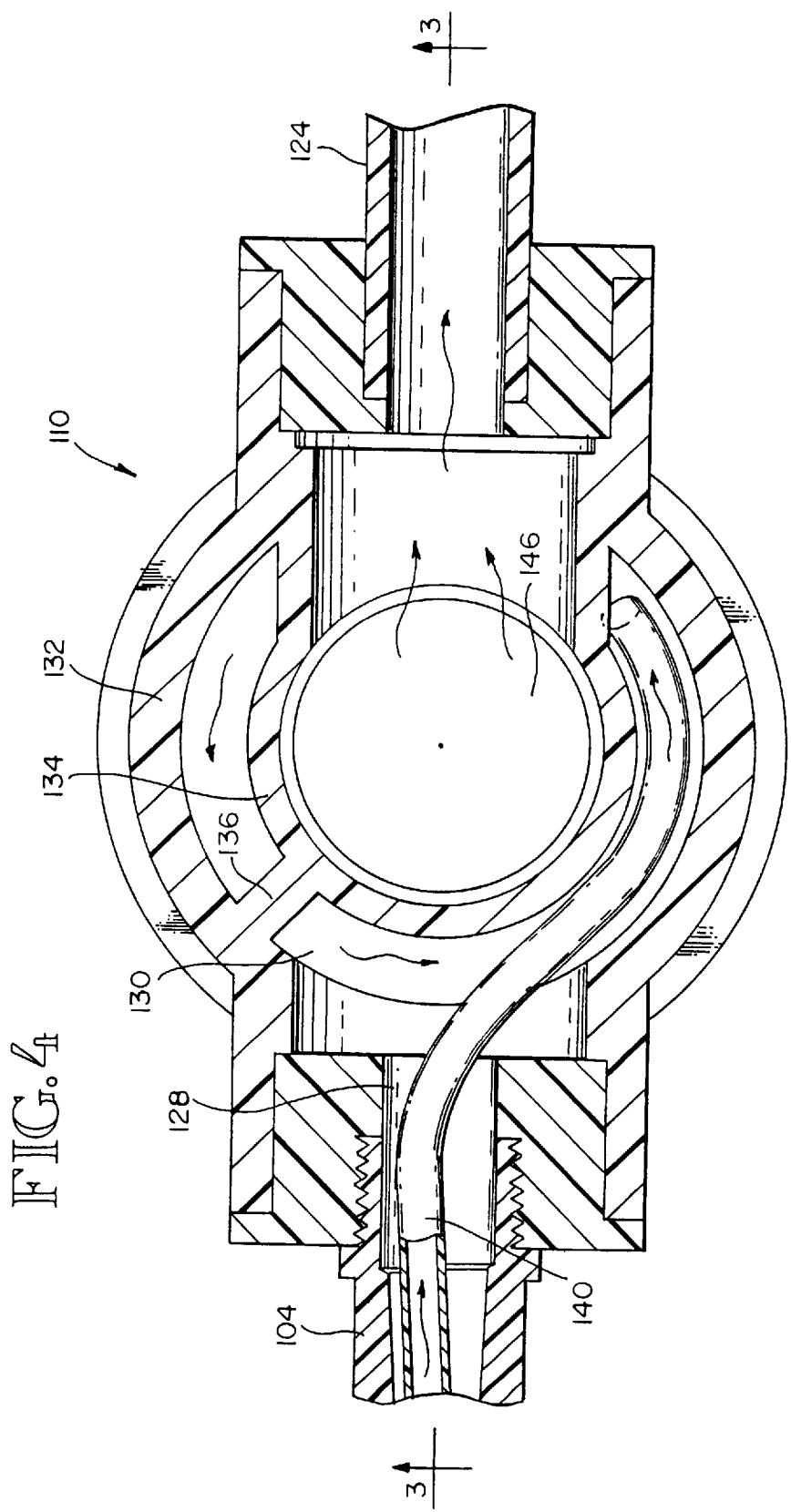

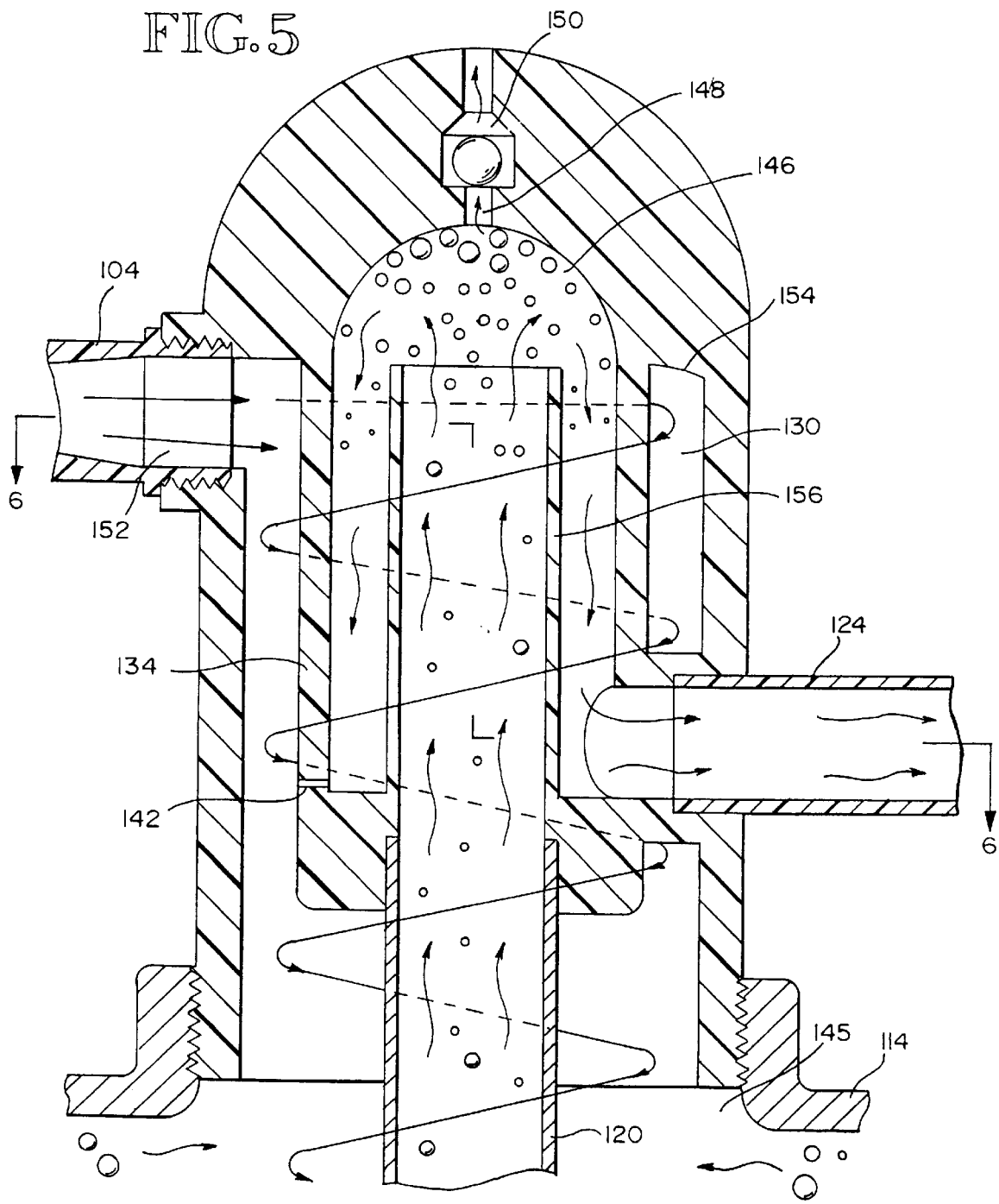

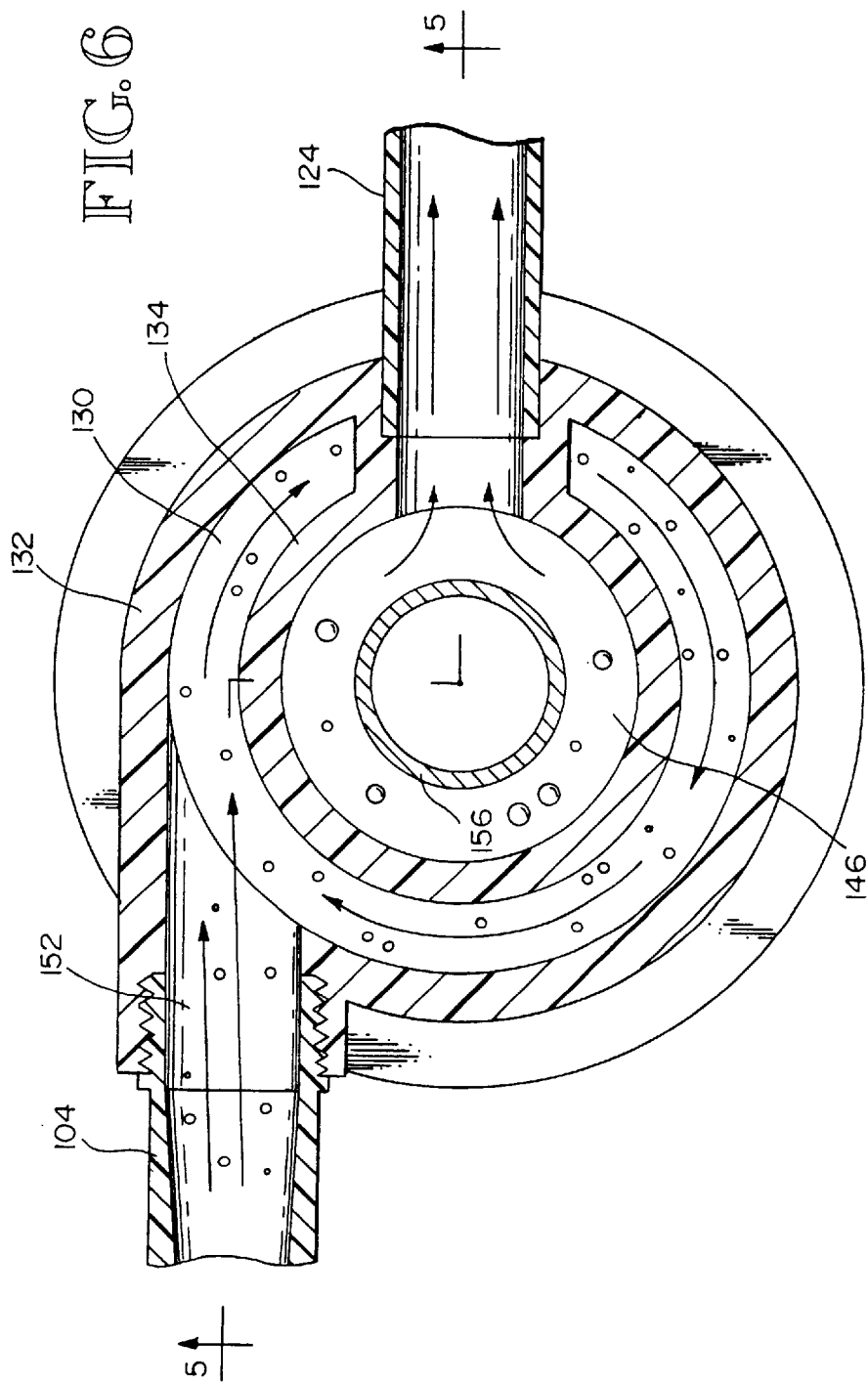

SYSTEM FOR TREATING LIQUIDS WITH A GAS

TECHNICAL FIELD

This invention relates to systems for introducing a gas, such as ozone, into a liquid, such as water, for the purpose of treating that liquid and then removing the gas from the liquid prior to use. This invention provides increased exposure and contact time of the treating gas to the treated liquid.

BACKGROUND OF THE INVENTION

Water contamination can be both naturally occurring or caused by man. Naturally-occurring substances like radon, carbon dioxide, and hydrogen sulfide, as well as heavy mineral content, including iron, calcium and manganese, can make water completely unusable or even toxic to some life forms. Reverse osmosis and other membrane filters are often too costly or too complicated for broad-based application. Injection of ozone, air, oxygen and other gases into water streams for disinfection, oxidation and gas stripping have been effectively used.

In order for gas injection to be effective at removing contaminants and/or killing bacteria, the gas must come into physical contact with as much of the water as possible and remain in contact for as long as possible. Typically, the treatment gas is bubbled through the liquid or injected, such as by a venturi. After exposure and contact, the gas is removed prior to use of the liquid.

Prior art systems usually attempt to maximize gas contact by increasing the amount of gas injected into the liquid. This is often insufficient because contact decreases as small bubbles combine into larger bubbles and is effectively terminated once those bubbles reach the top of a mixing vessel or chamber. It is difficult to control contact time other than to make the contact chamber taller, thereby increasing the amount of time it takes for bubbles to gravitate to the top.

SUMMARY OF THE INVENTION

The present invention provides an improvement over the prior art in that a liquid stream into which treatment gas has been added is introduced into a vortex chamber, creating a downward spiral flow of the liquid stream. This stream is forced into an upper end inlet of a contact tank. Treatment gas bubbles are forced downwardly through the tank to a lower end outlet. A degassing chamber is operably connected to the tank outlet and positioned above the tank outlet.

In preferred form, the treatment gas is introduced into the liquid by a venturi-type injector positioned immediately adjacent the vortex chamber. The vortex chamber and degassing chamber may be concentrically constructed such that the vortex chamber comprises an annular space positioned radially outwardly of the degassing chamber. In such an embodiment, the outlet of the contact tank would comprise a central draw tube having an opening adjacent the lower end of the tank and extending upwardly within the tank to the degassing chamber.

The degassing chamber may include a region of increased volume into which the liquid stream is delivered from the tank outlet, thereby providing a region of decreased pressure for facilitating removal of the treatment gas from the liquid. The treatment gas may be vented from the degassing chamber to the atmosphere or collected for disposal.

The present invention may be used for treating drinking water, swimming pool water or water for other uses with a disinfecting gas such as ozone or chlorine. The vortex chamber creates a thorough mixing of microscopic gas bubbles, creating a turbulence that breaks apart larger bubbles into small bubbles. The entrained gas bubbles are forced downwardly in a virtual cloud of microscopic bubbles through the contact chamber. A significant head pressure or back pressure on the system causes the bubbles to decrease in size as they are forced downwardly through the tank. As the liquid stream is drawn upwardly to the degassing chamber, the bubbles expand and combine for release from the liquid.

The present invention increases both gas exposure to the liquid and contact time between the liquid and treatment gas. Many other advantages and attributes of the invention will be noted by an examination of the following description of the inventor's best mode for carrying out the invention, the claims and appended figures of the drawing, all of which make up part of the disclosure of the present invention.

BRIEF DESCRIPTION OF THE DRAWINGS

Like reference numerals are used to indicate like parts throughout the various figures of the drawing, wherein:

FIG. 3 is a partially cut-away cross-sectional view of a vortex chamber and degassing chamber according to the present invention;

FIG. 4 is a sectional view taken substantially along line 4—4 of FIG. 3;

FIG. 5 is a cross-sectional view of an alternate embodiment of a vortex chamber and degassing chamber according to the present invention taken substantially along line 5—5 of FIG. 6; and FIG. 6 is a sectional view taken substantially along line 6—6 of FIG. 5.

BEST MODE FOR CARRYING OUT THE INVENTION

Figure 1:
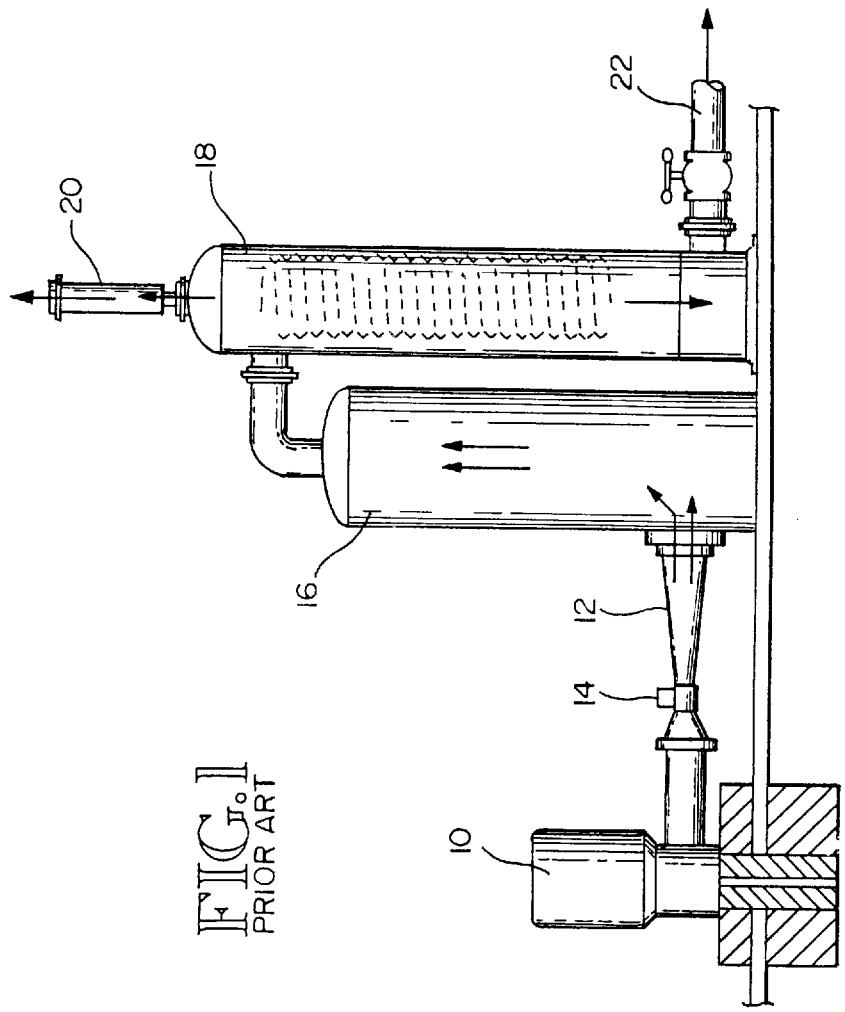
FIG. 1 is a schematic representation of a prior art water treatment system.

Referring the various figures of the drawing, and first to FIG. 1, therein is shown a schematic representation of a prior art system for treating liquids with injected gases. A pump 10 draws a liquid, such as water from a well, and delivers it under pressure to a venturi-type injector 12. Treatment gas, such as air or ozone, is drawn into the venturi intake 14 and is mixed with the liquid in a turbulent whirl of bubbles. The gas and liquid then enter a reactor vessel 16. Due to the sudden increase in volume, the turbulence is sharply decreased and the surface tension of gas bubbles causes them to want to combine into larger bubbles. The increased volume of the chamber may also decrease the pressure of the liquid and gas if sufficient back pressure is not maintained. As the bubbles rise, the head pressure created by the liquid decreases and individual bubbles expand. This increase in size of individual bubbles increases the likelihood of bubble collision and combination. The liquid is then de-gassed in a separator 18. The captured entrained gases are released through a relief valve 20 at the top of the separator 18. The treated fluid is then delivered for use through an outlet 22 at the bottom end of the separator 18. A separator 18 of this type is shown, for example, in U.S. Pat. No. 5,338,341, issued Aug. 16, 1994, to Angelo L. Mazzei and Steven D. Ford. A system of the type described above is sold by GDT Corporation, an alliance of Mazzei Injector Corporation and Claude Laval Corporation, of Phoenix, Ariz.

The present invention improves on the prior art by substantially increasing both the amount of contact between entrained gases and the liquid being treated and the amount of contact time. Accordingly, the required amount of treatment gas, such as ozone, may be substantially reduced.

Figure 2:
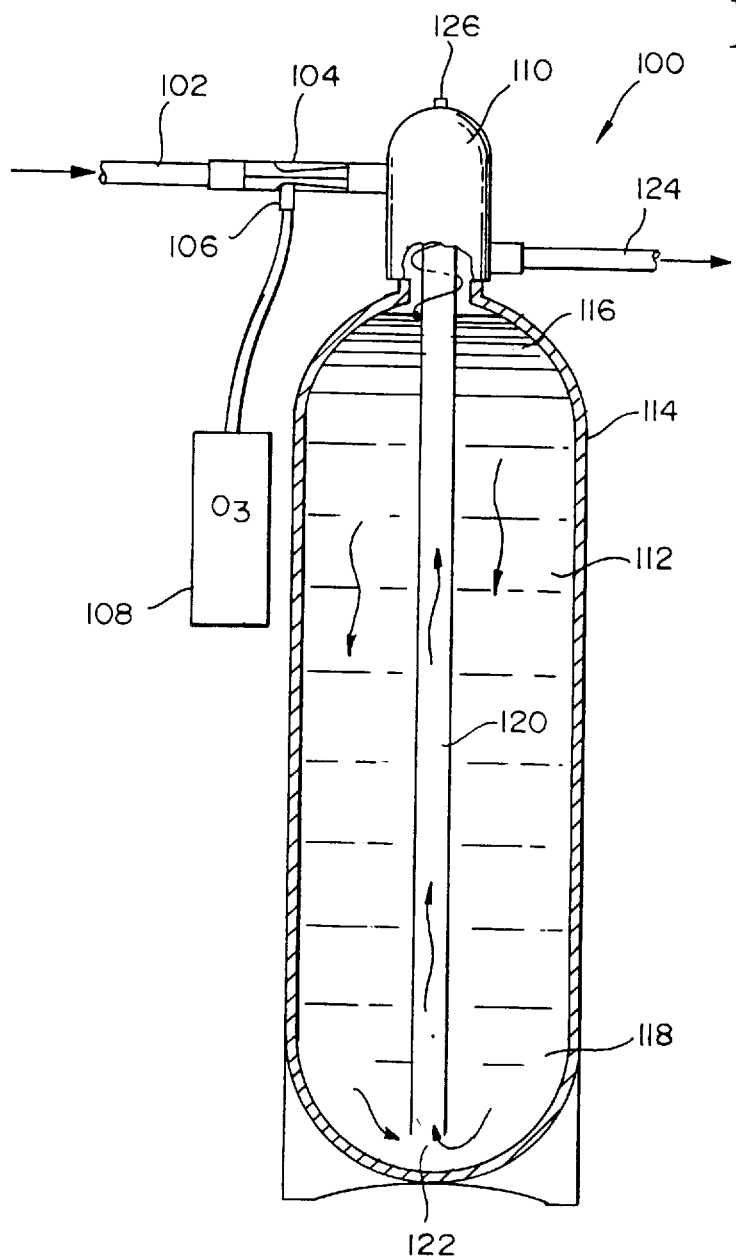
FIG. 2 is a partially cut-away side view of a water treatment system according to the present invention.

A preferred embodiment of the present invention is shown schematically in FIG. 2. This system was specifically designed for ozone (O$_3$) treatment of water for disinfection and removal of undesired minerals. The system 100 includes a water inlet 102 that delivers the water to a venturi-type injector 104. A preferred gas injector is manufactured by Mazzei Injector Corporation of Bakersfield, Calif. Ideally, the injector is made of PVDF (Kynar™) that is resistant to degradation by ozone gas. The suction port 106 is attached to a source of treatment gas, such as an ozone generator 108. Because the injector 104 can result in a substantial pressure drop (often as much as 20 psi), the water being supplied through the inlet 102 must be pressurized beyond the desired delivery pressure. This can be accomplished simply by using an appropriate well pump or booster pump for water supplied from a municipal water system.

As the water and entrained ozone exit the injector 104, it immediately enters a vortex chamber. This vortex chamber is not shown in FIG. 2, but will be explained in greater detail below. The vortex chamber is within a housing 110 that is especially designed or adapted according to the present invention.

A whirling motion is created within the vortex chamber causing microscopic-sized bubbles formed by the injector 104 to be thoroughly mixed with the water. By providing sufficient back pressure to the system, including the vortex chamber, these microscopic bubbles will remain entrained and will not have an opportunity to combine into larger bubbles. This gas/water mixture is then forced downward into a contact chamber 112 housed by an elongated tank 114. In preferred form, the tank 114 is cylindrical in cross-section with rounded ends. Common tanks of this type are available inexpensively made from polypropylene or polyurethane and reinforced exteriorly by wound glass fiber. Such tanks are available in common 6–12 inch diameters and in any desired length, such as 48 in. to 72 in.

The water with entrained ozone is then forced downwardly into the contact chamber 112. This is in contrast to many prior art systems that introduce the gas at the bottom end of a reactor vessel and then allow the bubbles to migrate upward.

As the microscopic bubbles are forced downward in a virtual cloud of entrained gas, they are compressed by the head pressure of the water in the tank 114. This pressure can be substantial, adding 0.03613 psi of head pressure per inch of water depth.

As the microscopic entrained bubbles are forced downward by incoming water and bubbles, their diminishing size and increasing pressure offset the tendency of surface tension to cause the bubbles to combine. Combined, and therefore, larger bubbles are not desirable because they result in less contact area between water and ozone gas. A rounded shape at the upper end 116 of the tank 114 will cause any combined, larger bubbles to migrate toward the center where a swirling, turbulent vortex of water and entrained bubbles are being forced downwardly into the tank 114. This vortex force will tend to break apart larger bubbles into a size small enough that they can be forced downwardly in the chamber 112.

As the water and entrained bubbles reach the lower end 118 of the chamber 112, they are drawn into a center draw tube 120 that has an opening 122 at its bottom end. In preferred form, the lower end 118 of the tank 114 is also rounded so that the opening 122 of the center draw tube 120 is adjacent the lowest point in the tank 114.

In some situations, flocculation of contaminants, such as iron, will occur in the chamber 112 due to reaction with the ozone or other treatment gas. The rounded bottom shape of the tank 114 prevents buildup of any such flocculent or precipitant, causing the solids to move by gravity to the center of the tank 114 and to be drawn into the opening 122 of the center draw tube 120. If desired, a filter or screen can be added at the opening 122 to catch these materials before they continue on through the water delivery system. Also, other conventional barrier filters may be installed at a later point in the system for removal of precipitated solids.

After the treated water with entrained gas bubbles enters the center draw tube 120, the bubbles will rapidly ascend due to their differential and specific gravity, as well as due to the flow of water. As the bubbles rise, head pressure decreases and the bubbles expand. The expanding bubbles come into closer contact with one another, causing them to combine as they ascend. As the bubbles reach the upper chamber 110, the disinfection and decontamination effect is complete and separation of the gas from the water (also known as "off-gassing" or "de-gassing") is achieved before the water is delivered through an outlet 124 for eventual use.

In preferred form, off-gassing is achieved by delivering the flow of water and bubbles into a chamber of increased volume, causing rapid depressurization and release of entrained gases. The gas may be released to the atmosphere or otherwise through a relief valve 126. In preferred form, the outlet port 124 is at a lower end of the de-gassing chamber.

Referring now to FIGS. 3 and 4 together, therein is shown at 110 a first embodiment of the vortex housing. An inlet conduit is provided at 128 through which water with entrained gas bubbles is introduced. Within the housing 110 is a vortex chamber 130 which is shaped to create a swirling action. The vortex chamber 130 is an annular space formed between an outer housing wall 132 and an inner housing wall 134. To one side of the inlet port 128, there is a barrier wall 136 extending downwardly from the top wall 138. This barrier wall 136 forces the swirling water with entrained ozone to spiral downwardly around the annular vortex chamber 130.

In preferred form, flexible nozzle tube 140 extends from the exit port of the venturi injector 104 into the vortex chamber 130 downwardly and toward the direction vortex rotation. This nozzle tube 140 allows the user to control the amount of turbulence introduced or voided as the ozonated water enters the vortex chamber 130. The direction of water flow and rotation is shown in FIGS. 3 and 4 by arrows.

When the system is first started, water must displace atmospheric air that would ordinarily fill the system. As water is introduced into the vortex chamber 130, air trapped in an upper region is allowed to escape through a very small vent hole 142. Once the system is filled with water, the amount of pressure loss through the vent hole 142 is negligible.

As the ozonated water swirls around the vortex chamber 130, microscopic entrained bubbles of ozone mingle with the water. This exposure in contact with the ozone disinfects and purifies the water. The vortex-type turbulence does not induce the joining of bubbles. Upon entering the upper portion 116 of the tank 114, any large bubbles 144 that may have formed migrate upwardly and are drawn into the swirling vortex discharge 145.

After being forced downwardly through the contact chamber 112, the water is drawn into the central draw tube 120. The bubbles of ozone expand as they move upwardly, and are eventually introduced into a de-gassing or off-gassing chamber 146. The released gas is vented through an outlet port 148 to a pressure relief valve 150. The pressure relief valve 150 maintains the required back pressure in the system while allowing the previously-introduced gas to escape. The purified water from which the treatment gas has been removed then flows through an outlet port 124 for use.

Referring now to FIGS. 5 and 6 together, therein is shown an alternate preferred embodiment of the present invention. In this embodiment, the delivery tube 140, shown in FIGS. 3 and 4, is unnecessary. Instead, an inlet port 152 is provided for direct attachment of the venturi-type injector 104 and is positioned to tangentially introduce the flowing water into the vortex chamber 130. The overall vertical length of the vortex chamber 130 may be varied or selected according to individual preferences. The action and effect of the embodiment shown in FIGS. 5 and 6 is identical to that previously described. It is also unnecessary to have a barrier wall as shown at 136 in FIGS. 3 and 4. Instead, a mere slight decline 154, as shown in FIG. 5, is sufficient to facilitate the downward spiral of the vortex swirl.

In preferred form, the inner housing 134 is adapted at its lower end to accept a standard size piece of PVC pipe for use as a draw tube 120. The inside diameter of the inner housing 134 should be approximately twice the diameter of the draw tube 120. The draw tube 120 may be extended upwardly into the de-gassing chamber 146 a selected distance, or a fixed inner tube 156 may be provided to a pre-adjusted location. By providing an increased volume in the de-gassing chamber 146, release of entrained gas bubbles is facilitated. The released gas will exit through an outlet port 148 which may be provided with a built-in pressure relief valve or air bleed float valve 150. Water in the de-gassing chamber 146 is then forced to flow downwardly again to further facilitate gas separation. The treated water then outflows through the outlet port 124 for use.

In order to provide economy and diversity, it is preferred that the housing 110 that provides the vortex chamber 130 and de-gassing chamber 146 be provided with standard threads for mating to readily-available and commonly-sized tanks 114. Also, it is preferred that standard sized PVC pipe, such as 1 inch, 1¼ inch, 1½ inch or 2 inch diameter, be used for the draw tube 120. In this manner, the draw tube 120 can be cut to fit and installed on site.

In a typical purification system for use on a residential well, ¾ inch to 1 inch inlet and outlet ports are adequate. A tank diameter of 6 inches with a length of 48 to 54 inches is believed to provide at least 6 to 8 minutes of contact time between a virtual cloud of microscopic ozone bubbles and the water being treated. In use it is expected that the treatment system will operate approximately 15 minutes every six hours.

For larger applications, such as swimming pools or larger water systems, 2 inch to 3 inch inlet and outlet ports may be used. In a larger embodiment such as this, it will be necessary to use a larger diameter draw tube and de-gassing chamber, also. Larger tanks, such as 10 to 12 inches or larger in diameter, may also be required.

A wide variety of alterations and adjustments may be made to the disclosed, preferred embodiments without departing from the spirit and scope of the present invention. Accordingly, the scope of patent protection is not to be limited by the disclosed embodiments, but rather by the following claim or claims interpreted according to accepted doctrines of claim interpretation, including the doctrine of equivalents and reversal of parts.

What is claimed is:

1. Apparatus for treating liquid with a gas, comprising:
    an inlet providing a liquid stream into which bubbles of a treatment gas have been entrained;
    a vortex chamber into which the liquid stream enters, the chamber creating a downward spiral flow of the liquid stream;
    a contact tank having a tank inlet at an upper end and a tank outlet at a lower end, the downward spiral flow being delivered into the tank inlet to force a flow of the liquid stream downward in the tank;
    a conduit being impervious to the liquid stream and having a conduit inlet and a conduit outlet, the conduit inlet operably connected to the tank outlet;
    a degassing chamber operably connected to the conduit outlet, said degassing chamber having an outlet for delivery of treated liquid for use.

2. The apparatus of claim 1, further comprising a venturi-type injector for adding treatment gas to the liquid.

3. The apparatus of claim 2, wherein the venturi-type injector is positioned immediately adjacent the vortex chamber.

4. The apparatus of claim 1, wherein the vortex chamber comprises an annular space around which the liquid stream downwardly spirals.

5. The apparatus of claim 4, wherein the degassing chamber is concentrically positioned within the vortex chamber, said annular space being provided radially outwardly of the degassing chamber.

6. The apparatus of claim 5, wherein the conduit comprises a central draw tube extending upwardly within the tank to the degassing chamber.

7. The apparatus of claim 6, wherein the contact tank comprises a substantially rounded bottom sloping toward the tank outlet.

8. The apparatus of claim 4, wherein the contact tank comprises a substantially rounded top sloping upwardly toward the tank inlet.

9. The apparatus of claim 4, further comprising a vent means for removing ambient air from the system at system start-up.

10. The apparatus of claim 1, wherein the degassing chamber is positioned at least as high as the vortex chamber.

11. The apparatus of claim 10, wherein the degassing chamber includes a region of increased volume into which the liquid stream is delivered from the tank outlet, thereby providing a region of decreased pressure for facilitating removal of the treatment gas from the liquid.

12. The apparatus of claim 10, wherein the degassing chamber further comprises a gas vent for release of removed treatment gas.

13. The apparatus of claim 12, wherein the gas vent comprises a valve means for keeping liquid in the system and venting gas without significant loss of back pressure.

14. The apparatus of claim 10, wherein the conduit comprises a central draw tube extending upwardly within the tank to the degassing chamber.

15. The apparatus of claim 1, wherein the degassing chamber includes a region of increased volume into which the liquid stream is delivered from the tank outlet, thereby providing a region of decreased pressure for facilitating removal of the treatment gas from the liquid.

16. The apparatus of claim 15, wherein the degassing chamber further comprises a gas vent for release of removed treatment gas.

* * * * *